United States Patent [19]  
Chichester

[11] 4,440,555  
[45] Apr. 3, 1984

[54] ENGINE COMPARTMENT AND AIR CLEANER

[75] Inventor: Willard L. Chichester, Battle Creek, Mich.

[73] Assignee: Clark Equipment Company, Buchanan, Mich.

[21] Appl. No.: 380,201

[22] Filed: May 20, 1982

[51] Int. Cl.³ .................. B01D 46/10; F02B 77/00
[52] U.S. Cl. ................... 55/385 B; 55/480; 55/493; 55/502; 55/503; 55/529; 55/DIG. 28; 123/195 C; 123/198 E; 180/68.3
[58] Field of Search .............. 55/385 B, 480, 493, 55/501–504, 507, 529, DIG. 28; 123/195 C, 198 E; 180/54 A, 69 R, 54.1, 54.2, 69.1, 69.2, 69.21; 280/5 A

[56] References Cited

U.S. PATENT DOCUMENTS

| | | | |
|---|---|---|---|
| 991,572 | 5/1911 | Weisenstein | 55/480 |
| 2,952,327 | 9/1960 | Farr | 55/DIG. 28 |
| 3,197,946 | 8/1965 | Taylor | 55/501 |
| 3,307,336 | 3/1967 | Dewsberry | 180/68.3 |
| 3,353,341 | 11/1969 | Stripp | 55/502 |
| 3,641,744 | 2/1972 | Culbert et al. | 55/319 |
| 3,712,033 | 1/1973 | Gronholz | 55/493 |
| 3,747,772 | 7/1973 | Brown | 55/502 |
| 3,762,489 | 10/1973 | Proksch et al. | 180/68.1 |
| 3,772,858 | 11/1973 | Klugman | 55/503 |
| 4,292,061 | 9/1981 | Land | 55/493 |
| 4,338,890 | 7/1982 | Shelby et al. | 180/69.2 |

Primary Examiner—David L. Lacey  
Attorney, Agent, or Firm—John C. Wiessler; Kenneth C. Witt

[57] ABSTRACT

An air cleaner system for an internal combustion engine located in a vehicle engine compartment. The system includes a cubic air filter device located beside the engine in the engine compartment which is arranged to draw air from outside the vehicle, pass it through a filter cartridge in the air filter device, and through a flexible conduit connecting the air filter device with the carburetor.

11 Claims, 14 Drawing Figures

ENGINE COMPARTMENT AND AIR CLEANER

BACKGROUND OF THE INVENTION

1. Field of the Invention:

This invention relates to an air cleaner system for an internal combustion engine which is located in a vehicle.

2. Description of Prior Art:

Cleaner systems which furnish combustion air to the carburetors of engines in self-propelled vehicles must necessarily be rather bulky in order to supply the amount of combustion air required without an excessive pressure drop. The air filters in such systems frequently are circular or cylindrical, and this geometrical configuration together with the bulk have contributed to many difficulties in the locating of air cleaner systems in the engine compartments of vehicles.

One approach to the resolution of difficulties with locating the air cleaner system in the engine compartment has been to locate part of the system in a closely adjacent compartment. Illustrations of this approach appear in U.S. Pat. Nos. 3,897,847 and 4,126,199, each of which shows a system which includes an air filter device located in an auxiliary compartment immediately ahead of the radiator for the vehicle and separated by the radiator from the engine compartment.

U.S. Pat. No. 3,641,744 shows a compact air filter device adapted for mounting in the engine compartment of a truck, on the truck engine, between the top of the engine and the bottom of the cab structure in a cab-over-engine vehicle; the filter in this patent is a rectangular and flat configuration with the incoming air flowing through the filter along one of the larger dimensions. U.S. Pat. No. 3,712,033 shows a flat rectangular filter which apparently is intended also for mounting directly above the engine of a vehicle; in this case the air flow through the filter is along the short dimension.

The air cleaner system according to the present invention features an air filter device which is space efficient, being generally cubic in shape, with theair filter device being installed near the side of the engine in a location which is generally better for both the vehicle designer and vehicle operator. The space in which the air filter device is located is one which is less likely to be occupied with other devices, thus making it easier for the vehicle designer, and in addition it is readily accessible to the operator or maintainer of the vehicle.

SUMMARY OF THE INVENTION

In carrying out this invention in one form an engine air cleaner system is provided for a vehicle having an engine compartment located in part between two side frame members, one of the side frame members having a horizontally disposed upper surface, and with the engine compartment defined in part by a vertically disposed movable door panel located above and closely adjacent the said upper surface. The engine air cleaner includes an air filter device comprising a cubic housing having an inlet portion and an outlet portion. The inlet portion comprises a bottom wall secured to the said upper surface and two end walls. There is at least one air inlet opening in the inlet portion for admitting air into the housing. A filter is mounted in the housing at an acute angle with the bottom wall and in a sealing relation with the outlet portion of the housing. The outlet portion is provided with an outlet opening for directing air from the housing to the engine carburetor.

Figure 1:
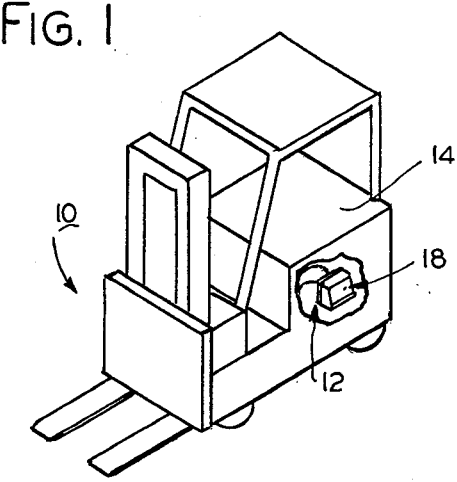
FIG. 1 is a diagrammatic view of a fork lift truck vehicle embodying a first form of this invention.
Figure 2:
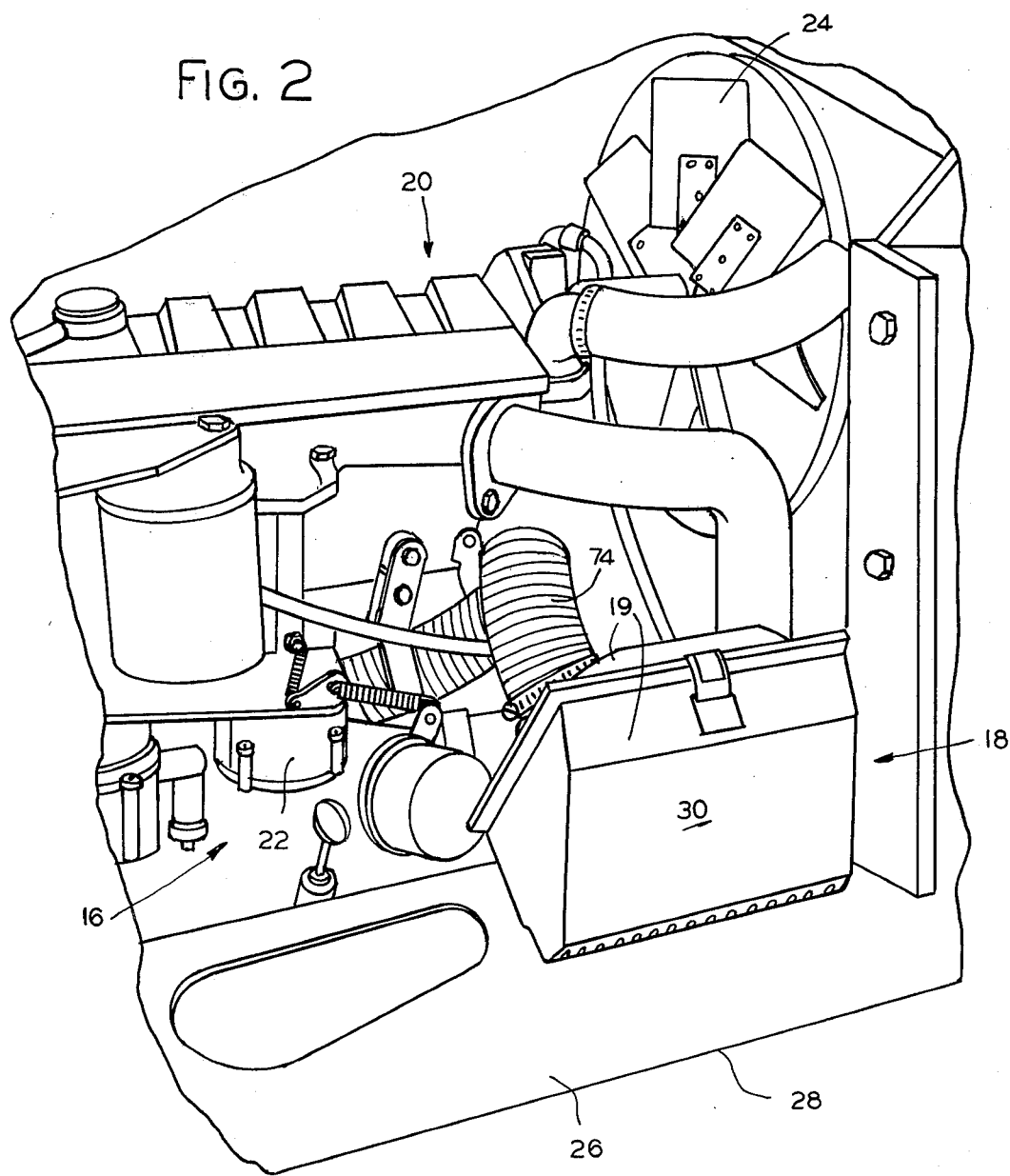
FIG. 2 is a partial perspective view of the engine compartment of the vehicle of FIG. 1.

DESCRIPTION OF PREFERRED EMBODIMENTS in FIG. 1 there is shown a schematic illustration of a fork lift truck vehicle 10 embodying a first embodiment of the engine air cleaner system of the present invention which is indicated generally by the numeral 12. The vehicle 10 includes a housing portion 14 toward the rear which houses an engine compartment 16 (see FIG. 2). In both figures there appears an air filter device 18, which includes a two-part housing 19, and which forms part of the air cleaner system 12. Also appearing in FIG. 2 are part of the engine 20, including a carburetor 22 and a cooling fan 24. Also shown in FIG. 2 is the upper surface 26 of side frame member 28 of the vehicle 10.

Figure 3:
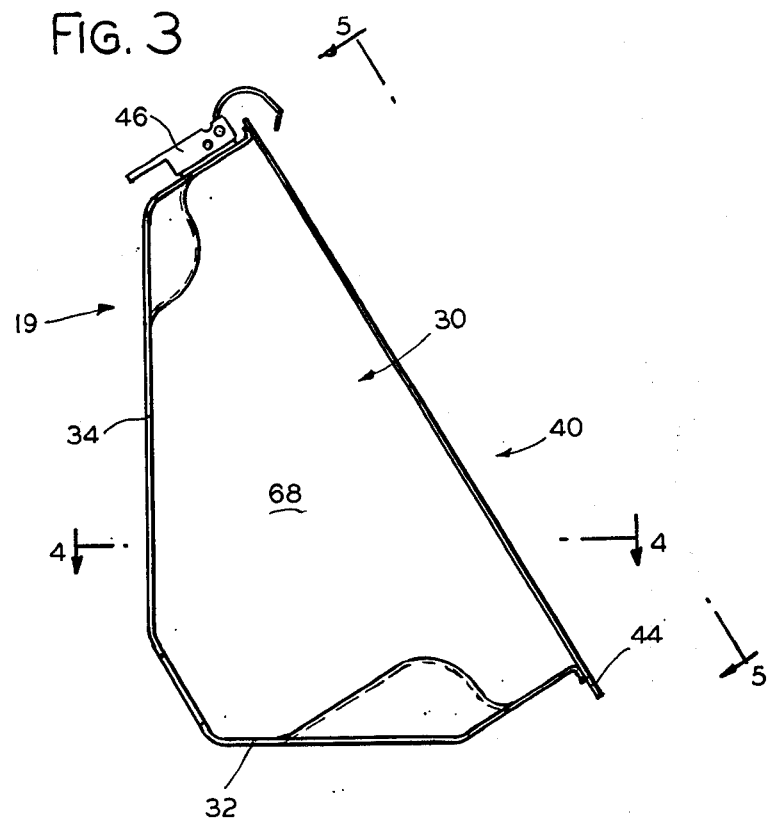
FIG. 3 is a sectional view along the line 3—3 in FIG. 4 of the inlet portion of the housing of the air filter device.
Figure 4:
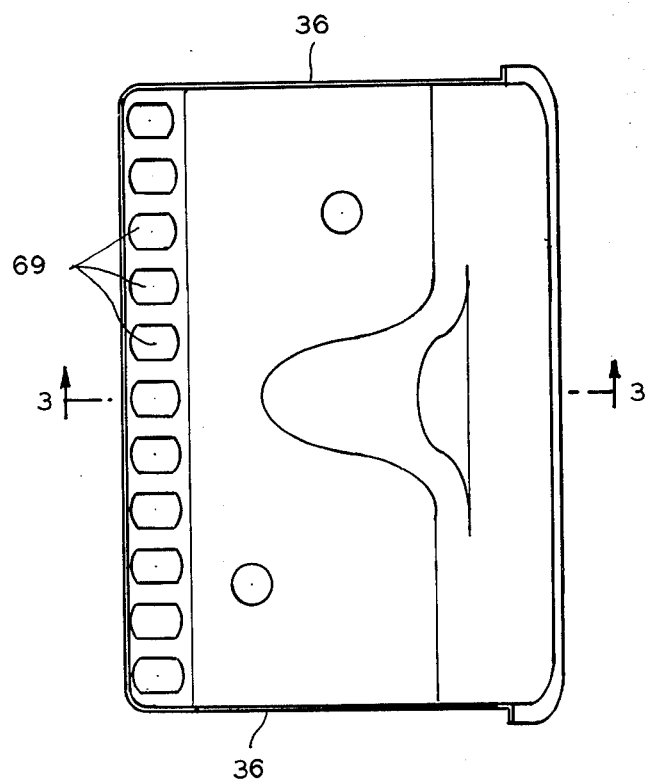
FIG. 4 is a top plan view in section along the line 4—4 in FIG. 3 of the inlet portion.
Figure 5:
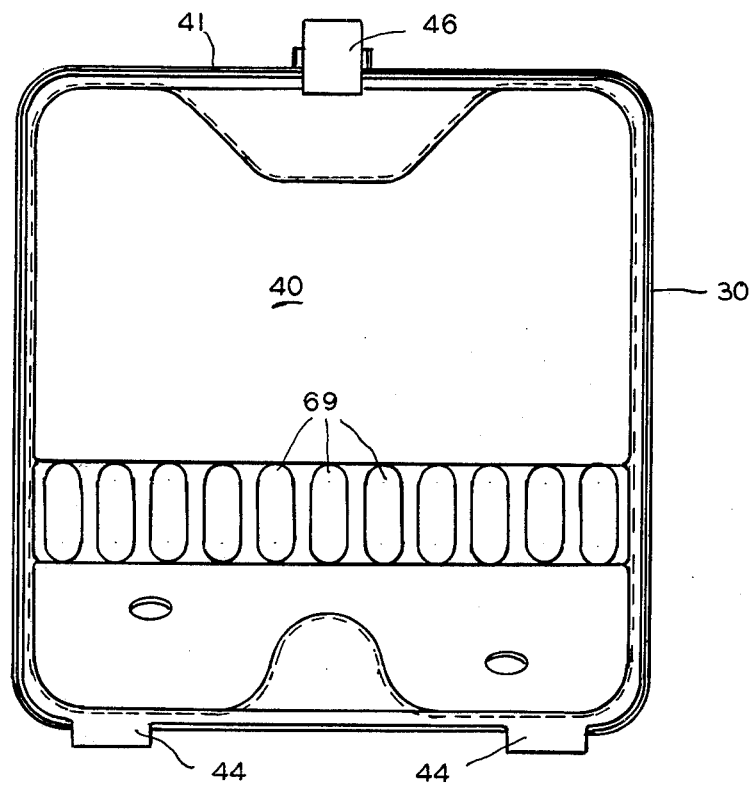
FIG. 5 is a view of the inlet portion along the line 5—5 of FIG. 3.

FIG. 3 of the drawing is a view in section of the inlet portion 30 of the housing 19 of air filter device 18 looking from the rear toward the front of the vehicle. The inlet portion 30 includes a bottom wall 32, a side wall 34 and end walls 36 (see FIG. 4). The inlet portion 30 may be a deep-drawn stamping which embodies the four walls just described and also includes a large opening 40 which is covered by the outlet portion or cover 42 illustrated in FIGS. 6 and 7. The inlet portion 30 may include strengthening ribs and other features normal for such a stamping. In addition, as shown, it is equipped with a pair of tabs 44 at the bottom and an overcenter type of lever-spring fastener 46 at the top for securing the cover 42 to the inlet portion 30. See FIG. 5.

The housing 19 is referred to herein as cubic in that the principal part, inlet portion 30, is essentially a cube or parallelepiped formed by the bottom wall 32, side wall 34 and end walls 36 with such geometric structure truncated along a plane forming an acute angle with both the bottom wall 32 and the side wall 34; the opening 40 is in such plane. The inlet portion 30 is airtight except for inlet openings 69, which are discussed later, and opening 40, and it defines an inlet plenum 68 as described hereinafter.

Figure 6:
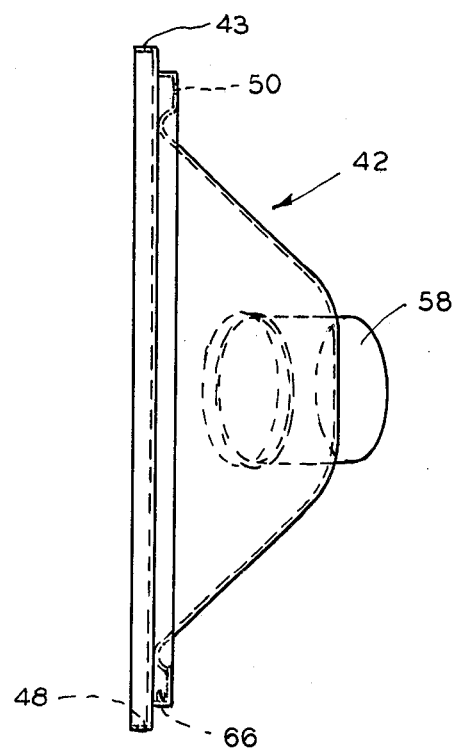
FIG. 6 is a side elevational view of outlet portion of the air filter device housing in an upright position.
Figure 7:
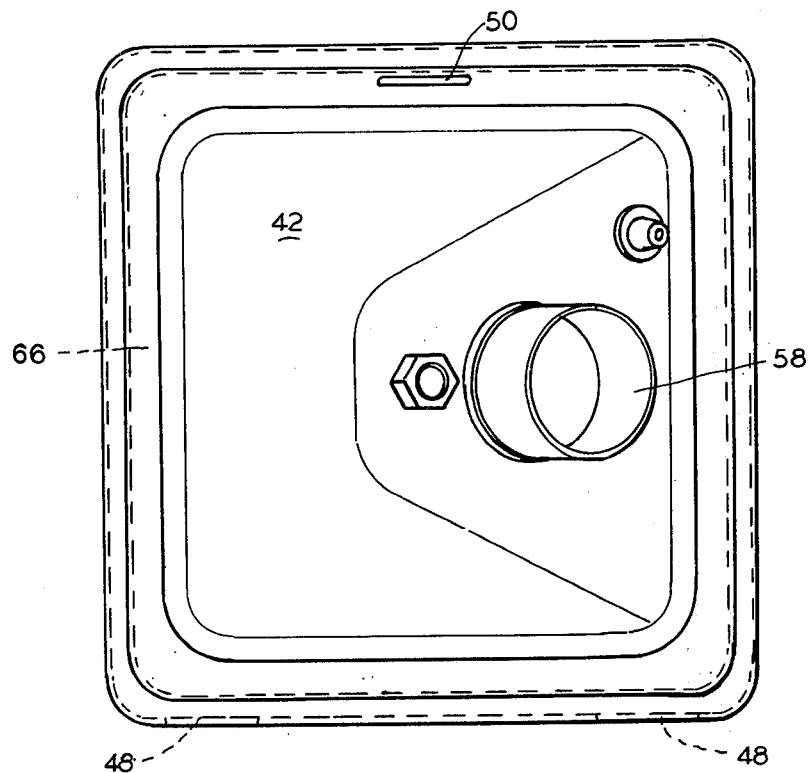
FIG. 7 is a plan view of the outlet portion of FIG. 6.

FIGS. 6 and 7 of the drawing show the other portion of housing 19, that is, cover 42 which may also be a deep drawn stamping. The cover member forms a discharge plenum 60 as described later, and includes a rimmed edge 43 which mates with edge 41 surrounding the opening 40 in the body member 30. The cover 42 is provided with slots 48 which mate with the tabs 44 on the body member and a slot 50 which is engaged by fastener 46 when the cover 42 is installed on the inlet portion 30. The cover 42 also includes a nipple connector 58 forming an air outlet for connecting the discharge plenum 60 inside the cover 42 with the carburetor on the engine through a flexible conduit 74.

Figure 8:
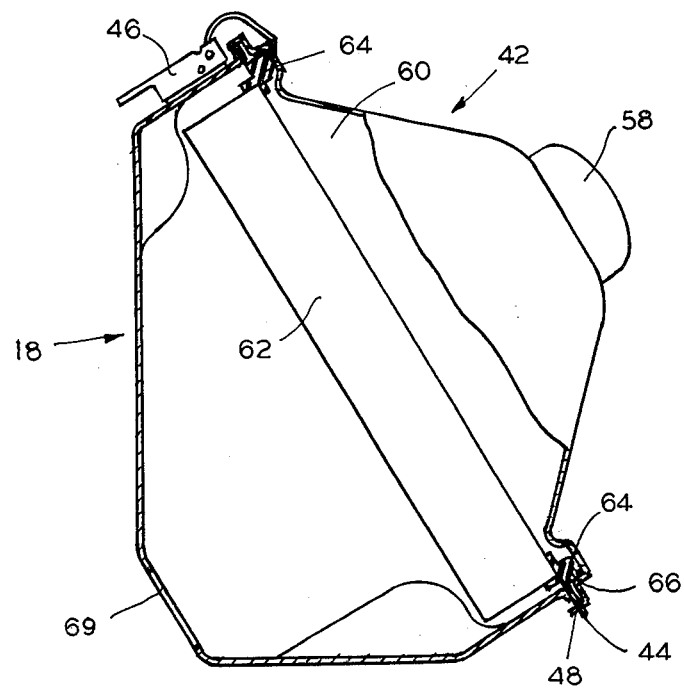
FIG. 8 is a view partially in section showing both the inlet portion and the outlet portion of the housing with the filter cartridge in place.

FIG. 8 of the drawing shows an air filter cartridge 62 installed on the cover 42 in the manner which applies during operation of the air cleaner system 12, with the cover 42 in place on the inlet portion 30 of the device 18 in condition for operation. The filter cartridge 62 may be of known type utilizing pleated paper filter material. The filter cartridge has a resilient seal 64 around the entire perimeter of the filter cartridge which fits with a press fit into the mating groove 66 in cover 42 which is adapted to receive the seal 64. The filter 62 also is sealed internally so that only air which passes through the filter material in the filter reaches plenum 60 in the cover 42.

Figure 9:
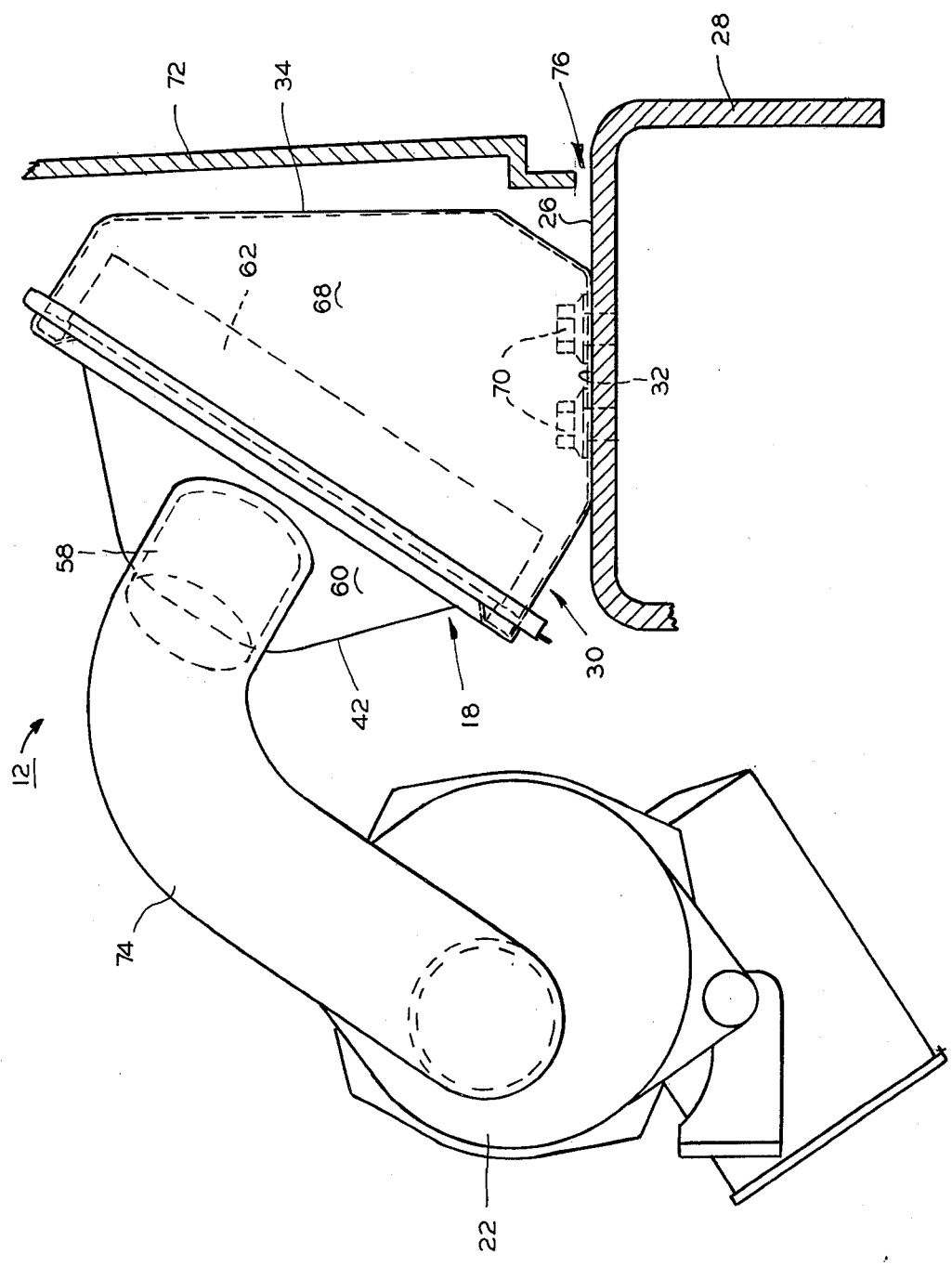
FIG. 9 is a fragmentary view looking from the front toward the rear of the vehicle showing the engine air cleaner system of the first embodiment in position on the vehicle.

FIG. 9 of the drawing illustrates the principal elements of the engine air cleaner system 12 in place on the vehicle 10 in a partially schematic sectional view looking from the front of the vehicle toward the rear. The bottom wall 32 of the inlet portion 30 of the housing 19 is secured to the upper surface 26 of frame member 28 by means of fasteners 70. The vehicle 10 is equipped with a side door panel 72 which when it is closed is adjacent side wall 34 of the inlet portion 30 as illustrated. The discharge outlet nipple 58 on cover 42 is connected by means of a flexible conduit 74 of molded neoprene or other suitable material to the intake of the carburetor 22. The conduit 74 has an elastic interference fit over the nipple 58 and the other end is similarly attached to the intake port of the carburetor. The use of a flexible conduit of this nature makes this invention versatile in that the carburetor need not always have the same location on the side of the engine as illustrated, and this invention can be used with a propane carburetor as well as a gasoline carburetor.

In operation, air for combustion is drawn from outside the vehicle through the space indicated by the arrow 76 between side panel 72 and frame member 28. After passing through space 76 it enters the inlet plenum 68 through one or more openings 69 through the wall of inlet portion 30 adjacent the juncture of bottom wall 32 and side wall 34. Several such openings are illustrated, however, one or more openings can be employed depending upon the volume of combustion air required. In operation, after the air enters the inlet plenum 68 it flows through the filter 62 into the discharge plenum 60 inside the cover portion of the device 18 and then through conduit 74 into the engine carburetor. The filter system is not located in prime space in the engine compartment but rather is tucked down into a corner; this is possible because of its size and configuration. However, in this arrangement it has access to cooler air from outside the engine compartment which may increase the efficiency of the engine.

Another important feature of this invention is that the under side of the filter cartridge 62 is the upstream side as far as air flow is concerned; therefore large particles which are filtered but not trapped in the filter cartridge itself fall down inside the inlet portion 30 of the air filter device 18 from where they may be easily removed when the filter device is serviced. The filter device of this embodiment is serviced by merely unsnapping the fastener 46 and disengaging the tabs 44 from slots 48 to remove cover 42 from inlet portion 30; this is done without disconnecting conduit 74. When the cover 42 is thus removed from the inlet portion 30 for a change of the filter cartridge, particles dislodged from the upstream side of the filter cartridge likewise simply fall down inside the inlet portion 30 where they may be readily removed. To complete servicing the filter device the cartridge 62 is changed by disengaging the peripheral seal 64 from cover 42 and replacing the filter cartridge and seal with a clean replacement cartridge and seal, after which the cover 42 is again secured on the inlet portion 30 of the air filter device.

FIGS. 10-14 show a second embodiment of the invention which is also the best mode contemplated for carrying out the invention. This second embodiment differs from the first in that the inlet portion and the outlet portion of the housing forming the air-cleaner device are rigidly secured together. The filter is sealed against the outlet portion as with the other embodiment but is held in place by means of a bracket which is readily detachable. There is no side wall on the inlet portion of the housing in the second embodiment and the filter cartridge can be removed by detaching the top of the bracket and pivoting it away from the outlet portion after which the filter cartridge can be lifted out through the opening which results from the absence of the side wall on the inlet portion.

Figure 10:
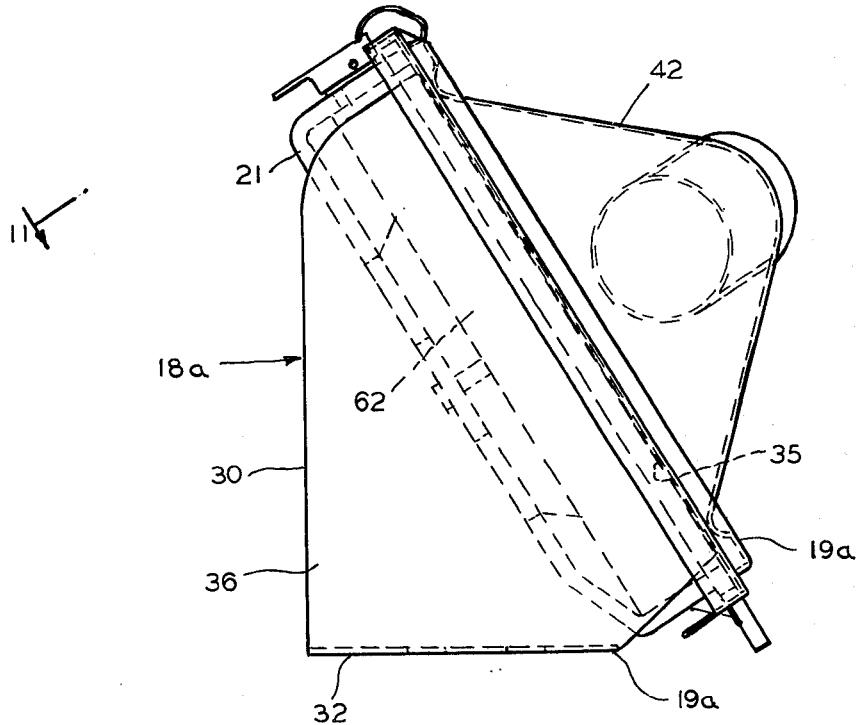
FIG. 10 is a side elevational view of an air filter device according to a second embodiment of the invention.

FIG. 10 of the drawing shows the complete air filter device of the second embodiment, which is indicated by the character 18a instead of 18 as for the first embodiment. Device 18a includes inlet portion 30 and outlet portion 42 of the housing, which is designated 19a for the second embodiment, and filter cartridge 62. Also, FIG. 10 shows support bracket 21 which is found only in the second embodiment.

Figure 11:
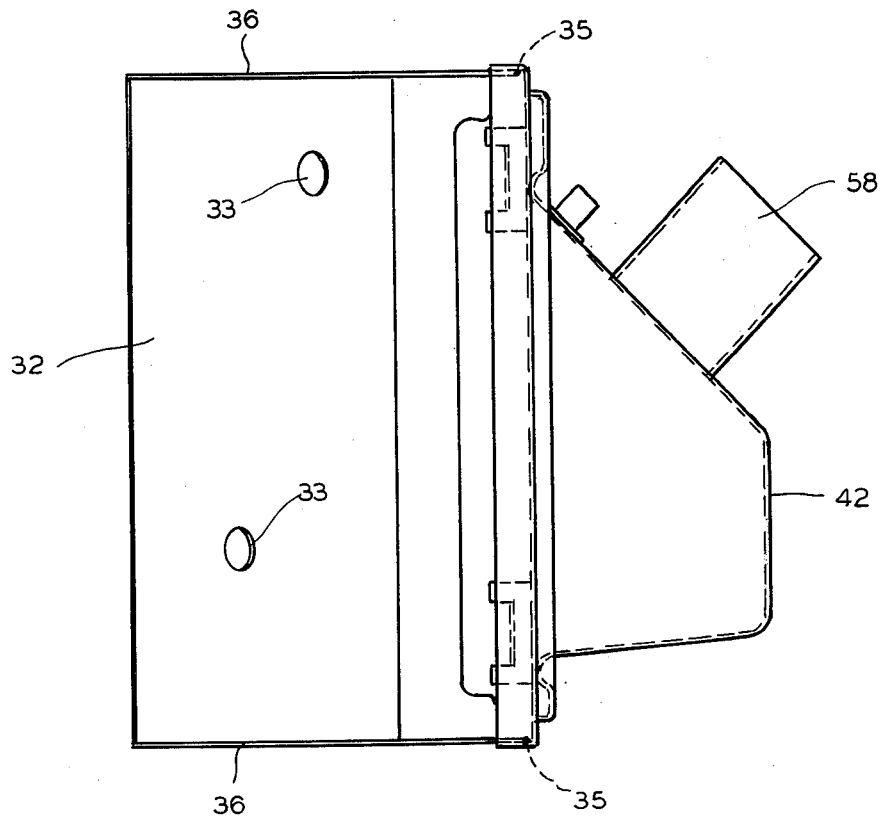
FIG. 11 is a view along the line 11—11 of FIG. 10.

For an understanding of the structure of housing 19a of the second embodiment reference should be made to FIG. 11 in conjunction with FIG. 10. FIG. 11 is taken along the line 11—11 of FIG. 10 but the filter cartridge 62 and the support bracket 21 have been omitted from FIG. 11. It will be apparent from these two figures that the inlet portion 30 of housing 19a includes only the bottom wall 32 and end walls 36 and that there is no side wall corresponding to 34 of the first embodiment. The diagonal edges 35 of side walls 36 are secured rigidly as by tack welding to the outlet portion 42 of the housing 19a. The openings 33 in bottom wall 32 may be used with fasteners 70, as in the first embodiment, to secure the housing 19a to the frame 28.

Figure 12:
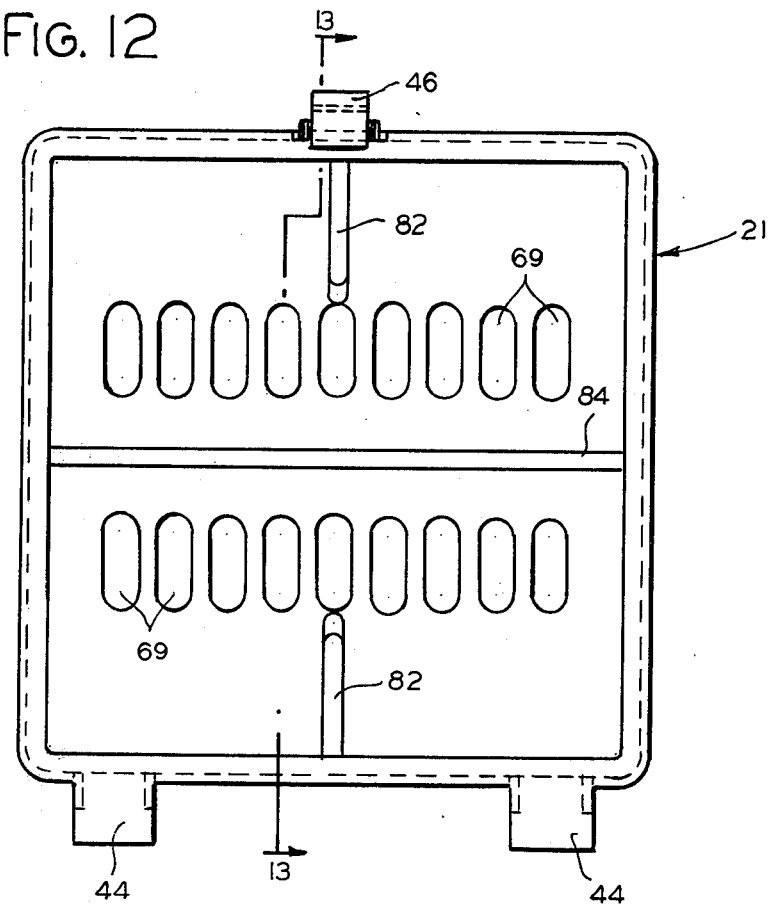
FIG. 12 is a plan view of a support bracket forming a part of the second embodiment.
Figure 13:
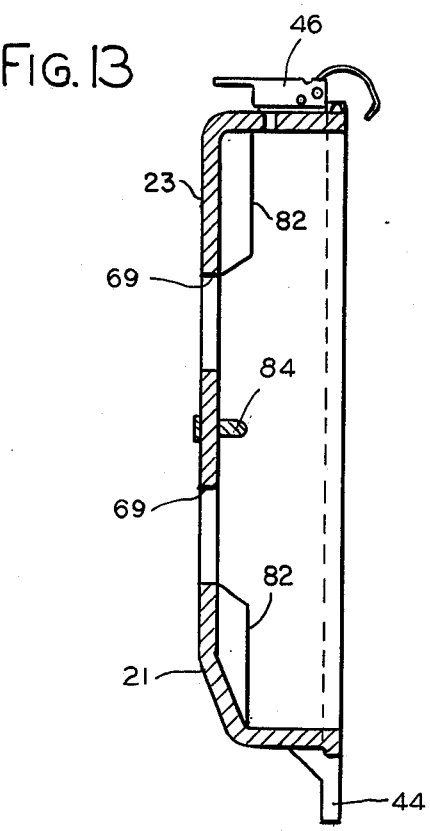
FIG. 13 is a sectional view along the line 13—13 of FIG. 12.

The support bracket 21 which is shown in greater detail in FIGS. 12 and 13 of the drawing may be made of either metal or plastic but reinforced plastic is preferred. As shown in FIGS. 12 and 13 the bracket 21 may be provided with vertically disposed rib portions 82 and a horizontal rib 84 which project perpendicularly from base portion 23 of bracket 21. Bracket 21 also includes one or more inlet openings 69 which have the same function as the openings 69 in the inlet portion of the housing in the first embodiment. In operation the filter cartridge 62 is engaged by the leading edges of the ribs 82 and 84 thus providing a space between the base portion 23 of bracket 21 and the filter cartridge 62 so as to provide an inlet plenum 68 having a depth equal to the depth of the ribs.

Figure 14:
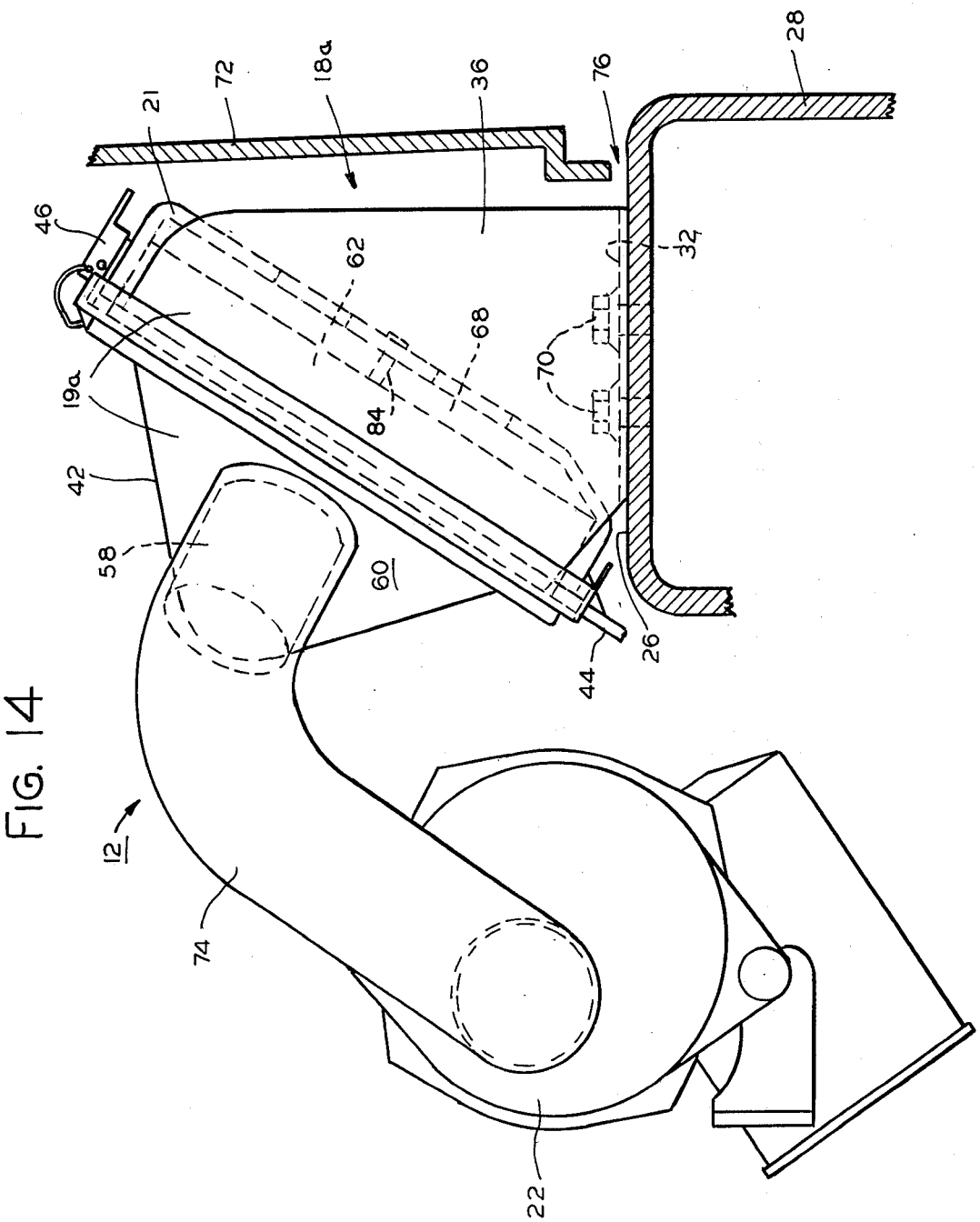
FIG. 14 is a fragmentary view looking from the front toward the rear of the vehicle showing the engine air cleaner system of the second embodiment in position on the vehicle.

In the second embodiment the filter cartridge 62 is removed from the air filter device 18a by unsnapping the overcenter device 46 which is located on bracket 21 and pivoting the top of the bracket 21 away from the outlet portion 42 of the housing 19a. Then the tabs 44, which are also on the bracket 21, are disengaged from the housing 19a, and the bracket and the filter cartridge which it contains can be readily removed from the air cleaner device. A clean filter cartridge 62 can be installed by the reverse of the same procedure. During operation the leading peripheral edge of the filter cartridge 62 is pressed against the outlet portion 42 of the housing with sufficient force to provide a seal, to prevent leakage of air around the filter cartridge and instead cause all air to pass through the filter element or elements in the filter cartridge. FIG. 14 of the drawing shows the second embodiment of the engine air cleaner system 12 in position on a vehicle.

While I have described and illustrated herein preferred embodiments of my invention including the best mode presently contemplated for using it, it will be understood that modifications and improvements may be made by those skilled in the art. Accordingly, it should be understood that I intend to cover by the appended claims all such modifications and improvements which fall within the true spirit and scope of my invention. For example, it should be understood that this invention is not limited to planar surfaces and openings such as the opening 40 in inlet portion 30 despite the terminology which has been used for convenience in the disclosure of this invention. As a further example, while the inlet portion 30 and the cover member 42 are disclosed as metal stampings and the bracket 21 as either metal or plastic it will be appreciated that they may be of other materials or made by other processes. Also, while a specific overcenter type fastener 46 and tabs 44 mating with slots 48 are shown for securing the cover 42 on the inlet portion 30, or bracket 21 on cover 42, other equivalent fastening means may be employed.

I claim:

1. An engine compartment for a vehicle in combination with an air cleaner housing, said engine compartment comprising two side frame members, one of said side frame members having a horizontally disposed upper surface, said air cleaner housing having an inlet portion and an outlet portion, said inlet portion comprising a bottom wall secured to said upper surface and two end walls and including an inlet opening for admitting air into said air cleaner housing, said outlet portion comprising an air outlet opening for directing air from said housing to the engine carburetor, a flat air filter mounted in said housing at an acute angle with said bottom wall, and said filter being sealed around its periphery to said outlet portion.

2. The combination as in claim 1 wherein said inlet portion and said outlet portion are rigidly secured together.

3. The combination as in claim 2 wherein said air filer is mounted in said housing by a bracket which is detachably connected to said outlet portion.

4. The combination as in claim 3 wherein said detachable connection comprises tabs on said bracket which project through openings in said outlet portion and an overcenter lever-spring device mounted on the bracket which engages the outlet portion.

5. The combination as in claim 1 wherein said inlet portion and said outlet portion are detachably secured together.

6. The combination as in claim 5 wherein said filter is sealed to said outlet portion by a resilient perimeter seal which fits with a press fit into a mating groove in the outlet portion.

7. The combination as in claim 5 wherein said inlet portion includes a side wall along with said bottom and end walls.

8. The combination as in claim 7 which comprises a vertically disposed movable door panel located above and adjacent said upper surface and adjacent said side wall.

9. The combination as in claim 8 wherein there is a space between said upper surface and the bottom edge of said door panel for admitting air from outside said vehicle into said air cleaner housing.

10. The combination as in claim 1 wherein said air outlet opening is connected by a flexible conduit with the engine carburetor.

11. The combination as in claim 1 wherein the air inert side of said filter is located above said bottom wall whereby particles which are filtered but not trapped in the filter or are dislodged from the filter fall by gravity onto said bottom wall.

* * * * *